(12) United States Patent
Takeya

(10) Patent No.: US 8,429,154 B2
(45) Date of Patent: Apr. 23, 2013

(54) DOCUMENT SEARCH DEVICE, IMAGING FORMING APPARATUS, AND DOCUMENT SEARCH SYSTEM

(75) Inventor: Hitoshi Takeya, Tokyo (JP)

(73) Assignee: Oki Data Corporation, Tokyo (JP)

( * ) Notice: Subject to any disclaimer, the term of this patent is extended or adjusted under 35 U.S.C. 154(b) by 433 days.

(21) Appl. No.: 12/171,412

(22) Filed: Jul. 11, 2008

(65) Prior Publication Data

US 2009/0019010 A1 Jan. 15, 2009

(30) Foreign Application Priority Data

Jul. 12, 2007 (JP) ................................. 2007-182786

(51) Int. Cl.
*G06F 7/00* (2006.01)
(52) U.S. Cl.
USPC .......................................... 707/723; 707/753
(58) Field of Classification Search .......... 707/722–723, 707/736, 740, 748, 753
See application file for complete search history.

(56) References Cited

U.S. PATENT DOCUMENTS

| | | | |
|---|---|---|---|
| 5,636,350 A | 6/1997 | Eick et al. | |
| 5,982,369 A * | 11/1999 | Sciammarella et al. | 715/835 |
| 6,275,229 B1 * | 8/2001 | Weiner et al. | 715/764 |
| 7,440,126 B2 * | 10/2008 | Hull et al. | 358/1.15 |
| 7,505,984 B1 * | 3/2009 | Nevill-Manning et al. | 1/1 |
| 2003/0072568 A1 * | 4/2003 | Lin et al. | 396/222 |
| 2004/0103090 A1 * | 5/2004 | Dogl et al. | 707/3 |
| 2006/0031253 A1 * | 2/2006 | Newbold et al. | 707/104.1 |
| 2007/0061752 A1 * | 3/2007 | Cory | 715/804 |
| 2007/0130145 A1 * | 6/2007 | Pedersen et al. | 707/9 |
| 2008/0182558 A1 * | 7/2008 | Rhee | 455/412.1 |

FOREIGN PATENT DOCUMENTS

| | | |
|---|---|---|
| JP | 04281566 A | 10/1992 |
| JP | 07-175825 | 7/1995 |
| JP | 07168854 A | 7/1995 |
| JP | 08-022470 A | 1/1996 |
| JP | 09160908 A | 6/1997 |
| JP | 2000-122770 A | 4/2000 |
| JP | 2000148763 A | 5/2000 |
| JP | 2000315210 A | 11/2000 |
| JP | 2002109448 A | 4/2002 |

OTHER PUBLICATIONS

Zaina et al, Revealing Relationships in Search Engine Results, in Proceedings of the 2005 Latin American conference on Human-computer interaction (CLIHC '05), 2005, ACM, pp. 120-127.*

* cited by examiner

*Primary Examiner* — James Trujillo
*Assistant Examiner* — Linh Black
(74) *Attorney, Agent, or Firm* — Panitch Schwarze Belisario & Nadel LLP

(57) ABSTRACT

A search device is provided that extracts and stores field data from document data and displays a search result in a two-dimensional coordinate system whose axes are freely chosen by a user. The search device has a data input unit for inputting input data to the search device, a field extraction unit for extracting field data from the input data, a data storage unit for storing the field data and the input data associated with the field data, a search word input unit for inputting a search word, a search processing unit for searching the field data in the data storage unit based on the inputted search word and for retrieving the input data associated with the found field data, and a display unit for displaying an icon, representing the input data found by the search processing unit, at a position in a coordinate system.

14 Claims, 16 Drawing Sheets

FIELD DATA TEMPLATE "TRIP REPORT"

| TRIP REPORT | |
|---|---|
| DESTINATION | A |
| PURPOSE | B |
| ROUTE | C |
| EXPENSE | D |
| THE NUMBER OF PEOPLE ON THE TRIP | E |

DETAIL
_____
_____
_____
_____

| | |
|---|---|
| DATE AND TIME OF GENERATION | F |
| DATE AND TIME OF RENEWAL | G |
| CREATOR | H |

FIG. 2

TRIP REPORT OF MR. TARO OKI

| TRIP REPORT | | DATE AND TIME OF GENERATION 2006/9/19 |
|---|---|---|
| DESTINATION | SHIBAURA | DATE AND TIME OF RENEWAL 2006/9/20 |
| PURPOSE | EXHIBITION | |
| ROUTE | FROM TASASAKI TO TOKYO | CREATOR MR. TARO OKI |
| EXPENSE | 10000 | |
| THE NUMBER OF PEOPLE ON THE TRIP | 2 PEOPLE | |
| DETAIL | | |

FIG. 3

FIELD NAME-VALUE PAIRS

```
00"DESTINATION","SHIBAURA";
01"PURPOSE","EXHIBITION";
02"ROUTE","FROM TAKASAKI TO TOKYO";
03"EXPENSE","10000 JPY";
04"THE NUMBER OF PEOPLE ON THE TRIP","3 PEOPLE";
05"DATE AND TIME OF GENERATION","2006/9/19";
06"DATE AND TIME OF RENEWAL","2006/9/20";
07"CREATOR","TARO OKI";;
```

FIG. 5

TRIP REPORT OF MR. TARO OKI

PRE-PROCESSING FOR
CALCULATION OF DEGREE OF SIMILARITY

| TRIP REPORT | |
|---|---|
| DESTINATION | SHIBAURA |
| PURPOSE | EXHIBITION |
| ROUTE | FROM TASASAKI TO TOKYO |
| EXPENSE | 10000 |
| THE NUMBER OF PEOPLE ON THE TRIP | 2 PEOPLE |
| DETAIL | |

| TRIP REPORT | |
|---|---|
| DESTINATION | |
| PURPOSE | THIS AREA IS NOT USE FOR CALCULATION OF DEGREE OF SIMILARITY |
| ROUTE | |
| EXPENSE | |
| THE NUMBER OF PEOPLE ON THE TRIP | |
| DETAIL | |

FIG. 13

DOCUMENT SEARCH DEVICE, IMAGING FORMING APPARATUS, AND DOCUMENT SEARCH SYSTEM

BACKGROUND OF THE INVENTION

1. Field of the Invention

The present invention relates to a document search device, an image forming apparatus, and a document search system.

2. Description of Related Art

In order to improve efficiency in creating a new document with word processing software on a computer, it is important to find and reuse a similar document which was made in the past. However, finding a document from among many files stored in a computer hard disk or a network storage is a time consuming job, and sometimes, a user fails to find the document that the user is looking for even though the user believes that the document should be stored somewhere in the hard disk.

Various document search technology has been developed to search the document stored in a storage apparatus. For example, Japanese Patent Application Publication No. H7-175825 (hereinafter referred to as JP '825) discloses a document search and display method that aims to improve convenience in document searching and displaying. A document search device of JP '825 is targeted for searching structured documents, and takes advantage of structural information of the documents to display a part of the document in an attempt to improve the convenience in displaying the search results.

The document search device of JP '825 improves the convenience in displaying the search result, for example, by allowing the user to see a layout display of the search result. But the document search device of JP '825 still places a great burden on the user in finding a document of interest from among many items listed in the search results and in finally determining that the document of interest does not exist.

SUMMARY OF THE INVENTION

This invention is made in consideration of such problems as described above, and provides a search device capable of lightening the burden placed on the user in finding the document of interest and in search refinement by displaying the search result in an easy-to-see graphical layout. Each of found documents in the search result is represented by an icon at a position in a two-dimensional coordinate system having a vertical axis and a horizontal axis. A user can freely choose any field for the vertical axis and the horizontal axis, so that the icons can be two-dimensionally sorted based on the field chosen for each of the axes. In addition, the size of each icon is changed according to a calculated importance rank of the document.

In order to solve problems as described above, the search device has a data input unit for inputting input data to the search device, a field extraction unit for extracting field data from the input data, a data storage unit for storing the field data and the input data associated with the field data, a search word input unit for inputting a search word, a search processing unit for searching the field data in the data storage unit based on the inputted search word and for retrieving the input data associated with the found field data, and a display unit for displaying an icon, representing the input data found by the search processing unit, at a position in a coordinate system.

When document data (the input data) is inputted to the search device of the present invention, the field extraction unit extracts field data, namely, field names and field values, from the document data. The document data is associated with the corresponding field data, and the field data and the document data are stored in the data storage unit. When a search word is inputted to the search word input unit, the search processing unit searches the data storage unit for the inputted search word to find a field value corresponding the inputted search word and find the document data associated with the found field value. The display unit displays a search result, in which each of found document data is represented by the icon at a position in the two-dimensional coordinate system having the vertical axis and the horizontal axis. The user can freely choose any field for the vertical axis and the horizontal axis, so that the icons can be two-dimensionally sorted based on the field chosen for each of the axes. In addition, the size of each icon is changed according to the calculated importance rank of the document.

The search device has a data judgment unit for making a determination as to whether the input data is document data or non-document data and a corresponding template search unit, wherein where the data judgment unit determines that the input data is the non-document data, the corresponding template search unit searches a field data template memory for a field data template corresponding to the input data, and the field extraction unit extracts the field data from the input data according to the found field data template, wherein where the data judgment unit determines that the input data is the document data, the field extraction unit extracts the field data from the input data.

When the data judgment unit determines that image data (non-document data) is inputted to the image forming apparatus, the corresponding template search unit finds the field data template corresponding to the inputted non-document data. Then, the field extraction unit extracts the field data from the non-document data according to the found field data template.

An image forming apparatus according to the present invention has the search device as described-above and an image forming unit for forming an image according to the input data.

A document search system according to the present invention has the search device as described-above and an information processing apparatus for generating the document data or the non-document data and for inputting the generated input data or the generated non-document data to the search device.

The search device according to the present invention displays the search result in an easy-to-see graphical layout. Each of found documents in the search result is represented by the icon at a position in the two-dimensional coordinate system having the vertical axis and the horizontal axis. The user can freely choose any field for the vertical axis and the horizontal axis, so that the icons can be two-dimensionally sorted based on the field chosen for each of the axes. In addition, the size of each icon is changed according to the calculated importance rank of the document. Thus, the user can easily find the document that the user is looking for from the icons visually arranged in the two-dimensional coordinate system. Therefore, the image forming apparatus according to the present invention greatly reduces a time and a labor that a user consumes in searching the document data that the user is looking for.

The image forming apparatus, having the search device according to the present invention and the image forming unit, reduces the labor placed on the user because the image forming apparatus is advantageous in being able to not only print the document data but also store and search the document data without any external apparatuses in addition to the advantage of the search device as described above.

In the document search system having the search device according to the present invention and the information processing apparatus, the user uses the information processing apparatus such as a personal computer to generate the input data, namely, the document data such as word processor file and the non-document data such as an image file, and inputs the generated input data into the search device. The user operates the information processing apparatus to communicate with the search device and retrieve the document data from the search device, and the user can see the search result displayed on the screen of the information processing apparatus. Accordingly, the user can precisely see the search result displayed on the screen of the information processing apparatus, and can accurately recognize the search result.

DETAILED DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein:

FIG. 2 is an example of document data used in the image forming apparatus according to the first embodiment;

FIG. 3 is an example of the document data used in the image forming apparatus according to the first embodiment;

FIG. 5 is a diagram describing an example of field name-value pairs according to the first embodiment of the present invention;

FIG. 13 is a figure describing a preprocessing prior to calculating a degree of similarity according to the second embodiment;

PREFERRED EMBODIMENTS

First Embodiment

Figure 1:
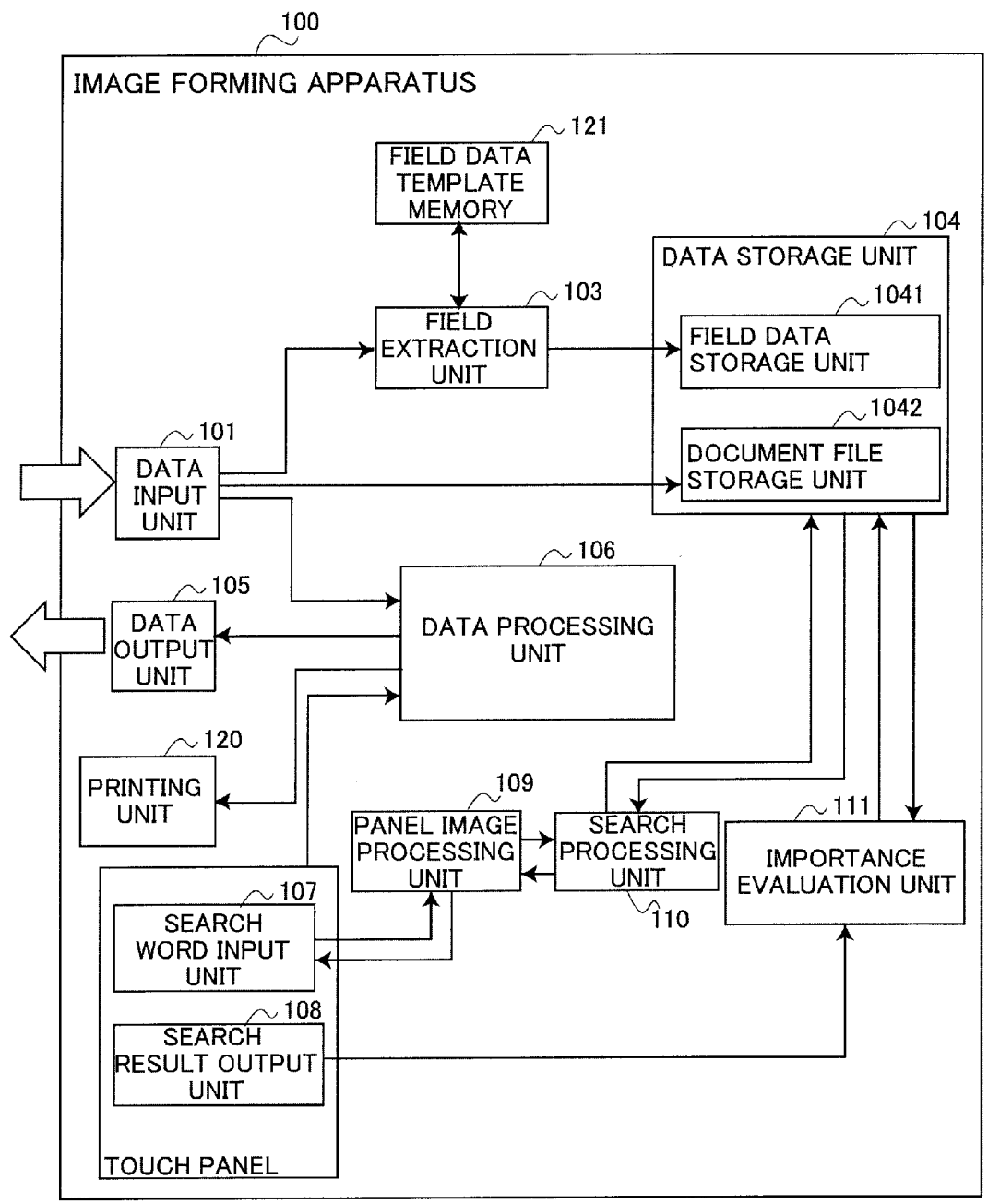
FIG. 1 is a block diagram describing a structure of an image forming apparatus according to the first embodiment.

FIG. 1 is a block diagram describing a structure of an image forming apparatus 100 having a search device according to the first embodiment. The image forming apparatus 100 such as an electrophotographic printer has a data input unit 101, a field extraction unit 103, a data storage unit 104, a data output unit 105, a data processing unit 106, a search word input unit 107, a search result output unit 108, a panel image processing unit 109, a search processing unit 110, an importance evaluation unit 111, a printing unit 120, and a field data template memory 121.

The data input unit 101 is a means to input a document file as document data into the image forming apparatus 100. The data input unit 101 communicates with a host computer as an information processing apparatus, a scanner, a data storage such as a USB (Universal Serial Bus) memory, a facsimile machine, and the like.

The field extraction unit 103 extracts field names and field values form the document data inputted from the data input unit 101 to generate field data.

The field data template memory 121 stores later-described field data templates.

The data storage unit 104 is a large capacity data storage such as a hard disk. The data storage unit 104 includes a field data storage unit 1041 and a document data storage unit 1042. The field data generated by the field extraction unit 103 is stored in the field data storage unit 1041, and the document data inputted to the data input unit 101 is stored in the document data storage unit 1042. The field data is associated with the corresponding document data, from which the field data has been extracted. The document data is also associated with the corresponding field data.

The data processing unit 106 performs a series of processings relating to image formation and the like from data input to data output.

The data output unit 105 outputs data and the like processed by the data processing unit 106. The data output unit 105 communicates with the host computer, the scanner, the data storage such as the USB (Universal Serial Bus) memory, the facsimile machine, and the like.

The printing unit 120 prints data and the like processed by the data processing unit 106.

The search word input unit 107 is a character input interface for inputting a search word. The search processing unit 110 searches the field data storage unit 1041 for the inputted search word. The search result output unit 108 displays a search result in response to a user's search request. In the present embodiment, the search word input unit 107 and the search result output unit 108 are composed of a touch panel, and for example, an LCD (Liquid Crystal Display) and the like.

The panel image processing unit 109 performs processings related to a search word input operation or a search result output operation on the touch panel.

The search processing unit 110 interprets the search request inputted by the user, and accesses the data storage unit 104 to retrieve from the data storage unit 104 the document file and the field data corresponding to the user's search request.

The importance evaluation unit 111 calculates an importance rank of each document file stored in the data storage unit 104. The importance rank is calculated from information such as time and date of printing, the number of printed copies, and the number of times the document file is selected from the search result. The more frequently the document file is printed or selected, the higher the importance rank thereof becomes.

A series of processings of the present embodiment is categorized into three stages, namely, a storing processing of the document data, a search processing, and a display processing of the search result. First, the storing processing of the document data will be described. The storing processing of the document data is performed every time the document data is inputted to the image forming apparatus 100. For example, a text file and a binary file generated by document generation software such as word processor software, spreadsheet software, and the like are the document data to be inputted to the image forming apparatus 100 via the data input unit 101 and stored in the data storage unit 104 of the image forming apparatus 100.

An example of a field data template is shown in FIG. 2. The field data templates are stored in the field data template memory 121. The document search device in the image forming apparatus 100 of the present invention receives the document file, for example, a trip report as shown in FIG. 3 from the host computer (information processing apparatus) via the data input unit 101. The trip report in FIG. 3 includes field data pairs consisting of field names such as "destination" and field values such as "Shibaura" arranged in a table. The document file of the trip report in FIG. 3 is not a database file but a mere document file of word processor software. Thus, such field names and field values in the trip report are indicated by tables, spaces, tabs, or underlines, which can be easily recognized by human but are difficult to be accurately recognized by computer software. That is, it is difficult for the document search device to indentify which text strings are field names and which text strings are field values. To solve this problem, the document search device of the present invention uses the field data template as shown in FIG. 2 to identify the positions of such field names and field values in the document file.

The trip report in the example of FIG. 2 has fields "destination", "purpose", "route", "expense", "the number of people on the trip", and "detail". In addition, the trip report has administrative field data "creation time", "modification time", and "creator", which serve as administrative information of the document. The user generates the document file such as the trip report as shown in FIG. 3 by filling out the field data template for the trip report as shown in FIG. 2.

Figure 4:
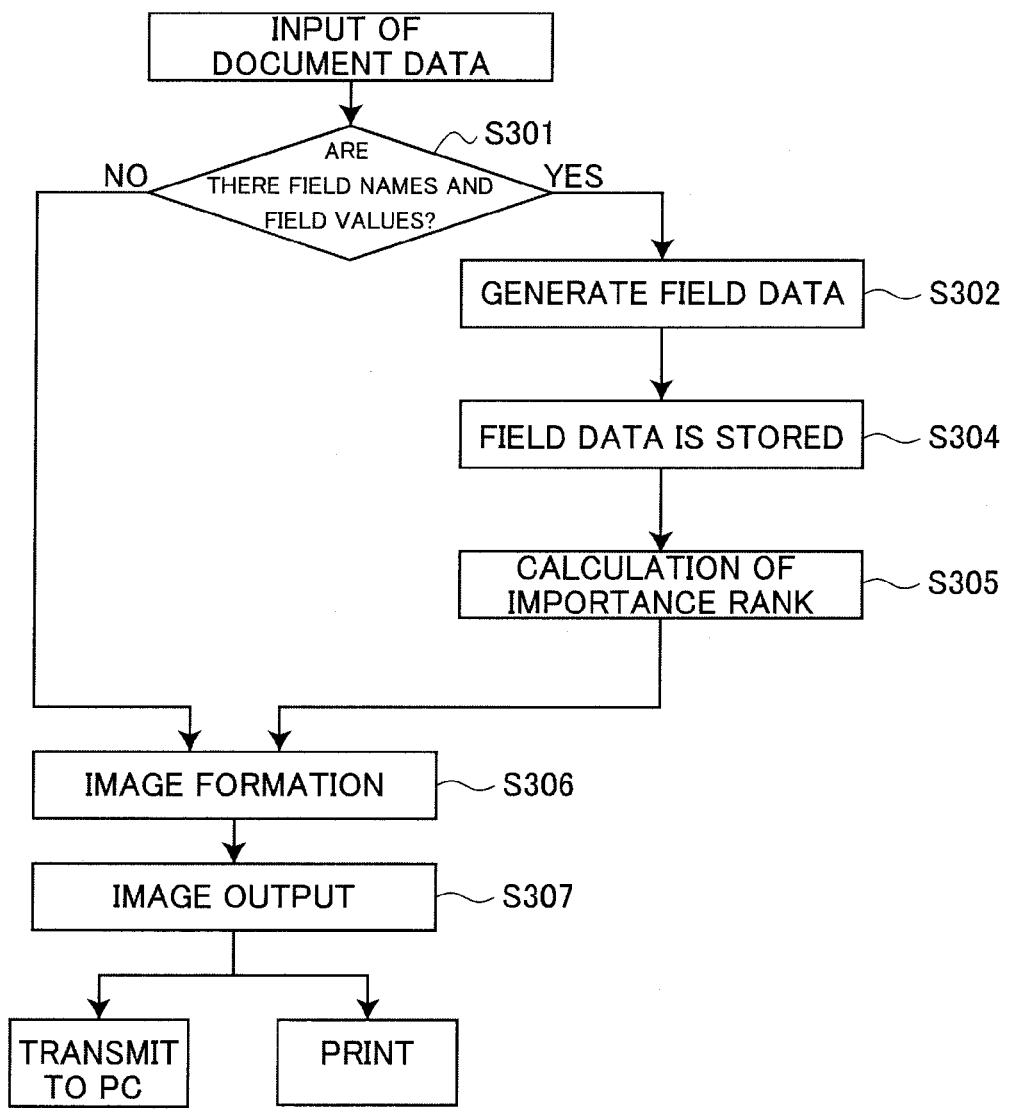
FIG. 4 is a flow chart describing a series of steps from a step for inputting the document data to the image forming apparatus via a data input unit to a step for outputting via a data output unit.
Figure 6:
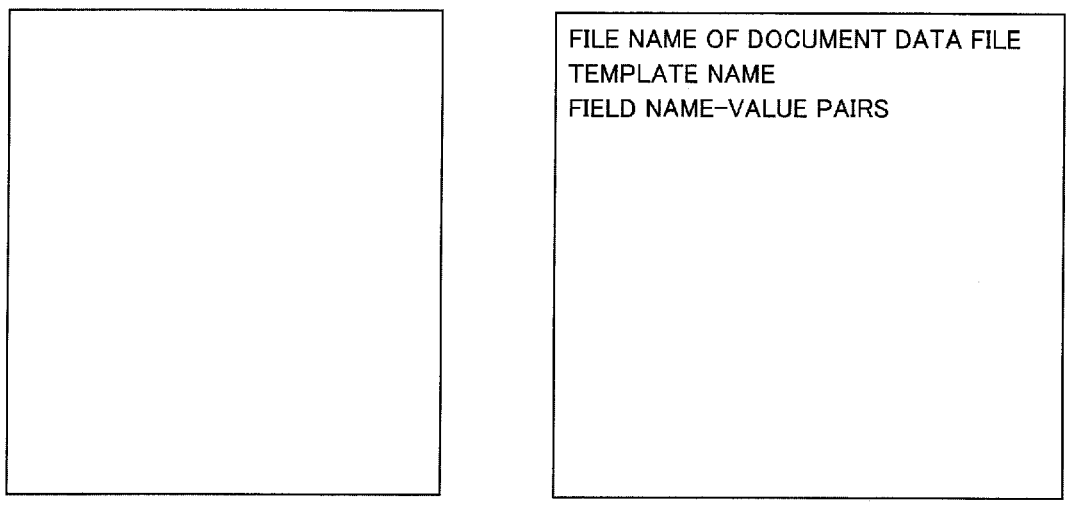
FIG. 6 is an example describing a document data file and field data stored in a data storage unit.

FIG. 4 is a flowchart showing a series of steps from a step of input of the document data via the data input unit 101 of the image forming apparatus 100 to a step of output via the data output unit 105 or printing with the printing unit 120. First, when the user inputs the document data to the image forming apparatus 100, the field extraction unit 103 makes determination at S301 as to whether the document data includes the field data. Where the field extraction unit 103 determines that the document data includes the field names and field values (S301 YES), the field extraction unit 103 extracts the field names and field values by comparing the document file with the corresponding field data template memorized in the field data template memory 121, and generates field name-value pairs as shown in FIG. 5. Subsequently, the field extraction unit 103 generates the field data (FIG. 6) by combining a filename of the document data file, a template name, and the extracted field name-value pairs (S302).

The field data generated by the field extraction unit 103 is associated with the document file from which the field data are extracted, and the field data associated with the document file is stored to the field data storage unit 1041 (S304).

Subsequently, at S305, the importance evaluation unit 111 calculates the importance rank of each document file stored in the data storage unit 104. The importance rank is calculated from information such as time and date of printing, the number of printed copies, and the number of times the document file is selected from the search result.

Subsequently, the data processing unit 106 forms an image based on the inputted document data at S306, and outputs the formed image to the data output unit 105 or prints the formed image with the printing unit 120 (S307). Further, where the field extraction unit 103 determines that the document data does not include the field names or the field values (S301 NO), steps S302 to S305 are not executed, and instead, a data processing for direct output is performed.

Figure 7:
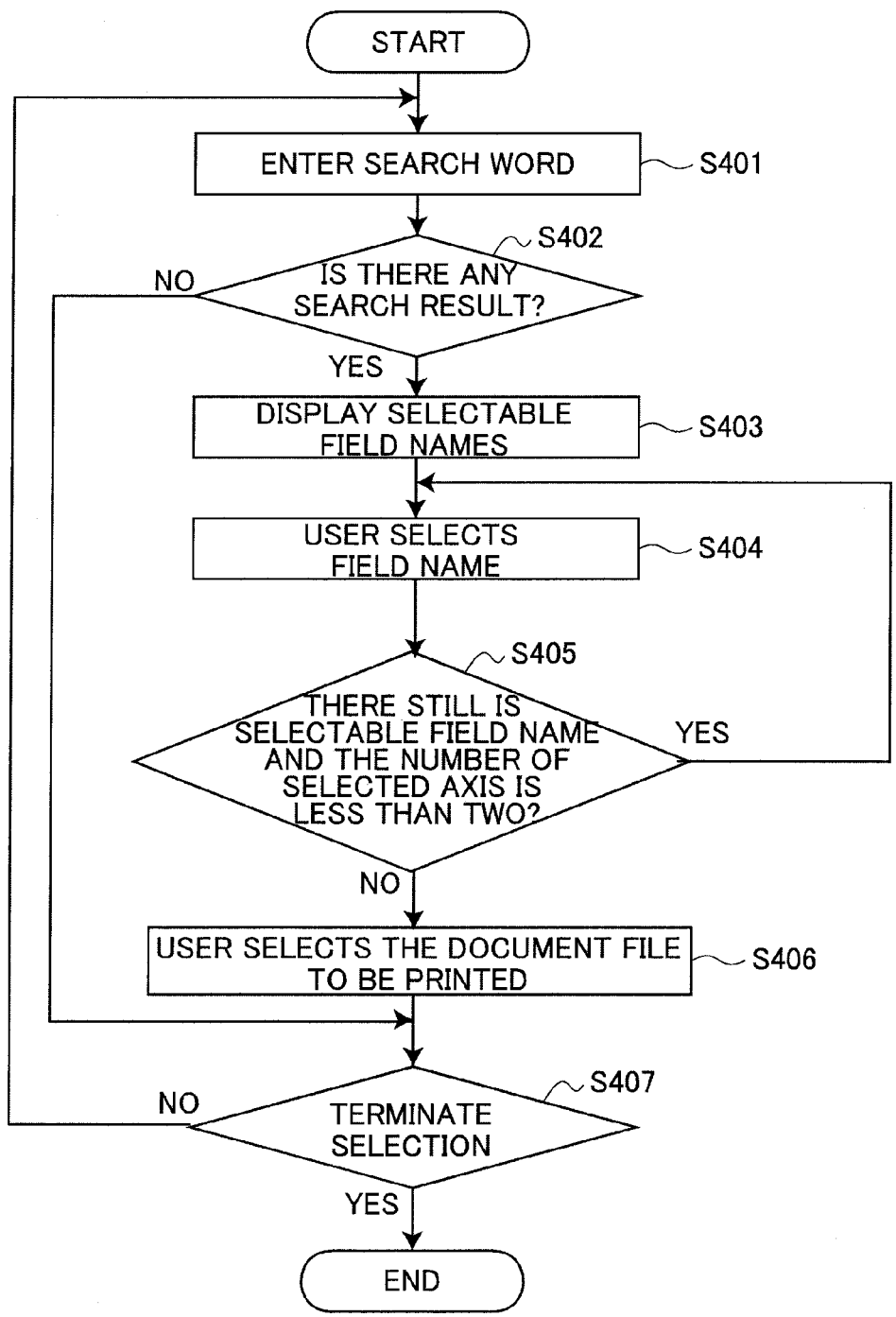
FIG. 7 is a flowchart describing a search processing and a display processing of the search result according to the first embodiment of the present invention.

The search processing and the display processing of the search result according to the present embodiment are hereinafter described with reference to a flowchart in FIG. 7. First, the user inputs the search word with the search word input unit 107 on the touch panel, or alternatively, with a keyboard of the host computer where the host computer is connected to the image forming apparatus 100 (S401). Operation with the search word input unit 107 on the touch panel is processed by the panel image processing unit 109. The search processing unit 110 receiving a search instruction from the panel image processing unit 109 searches the field data storage unit 1041 for the search word inputted to the search word input unit 107, and extracts the document data file associated with the search word.

Figure 8:
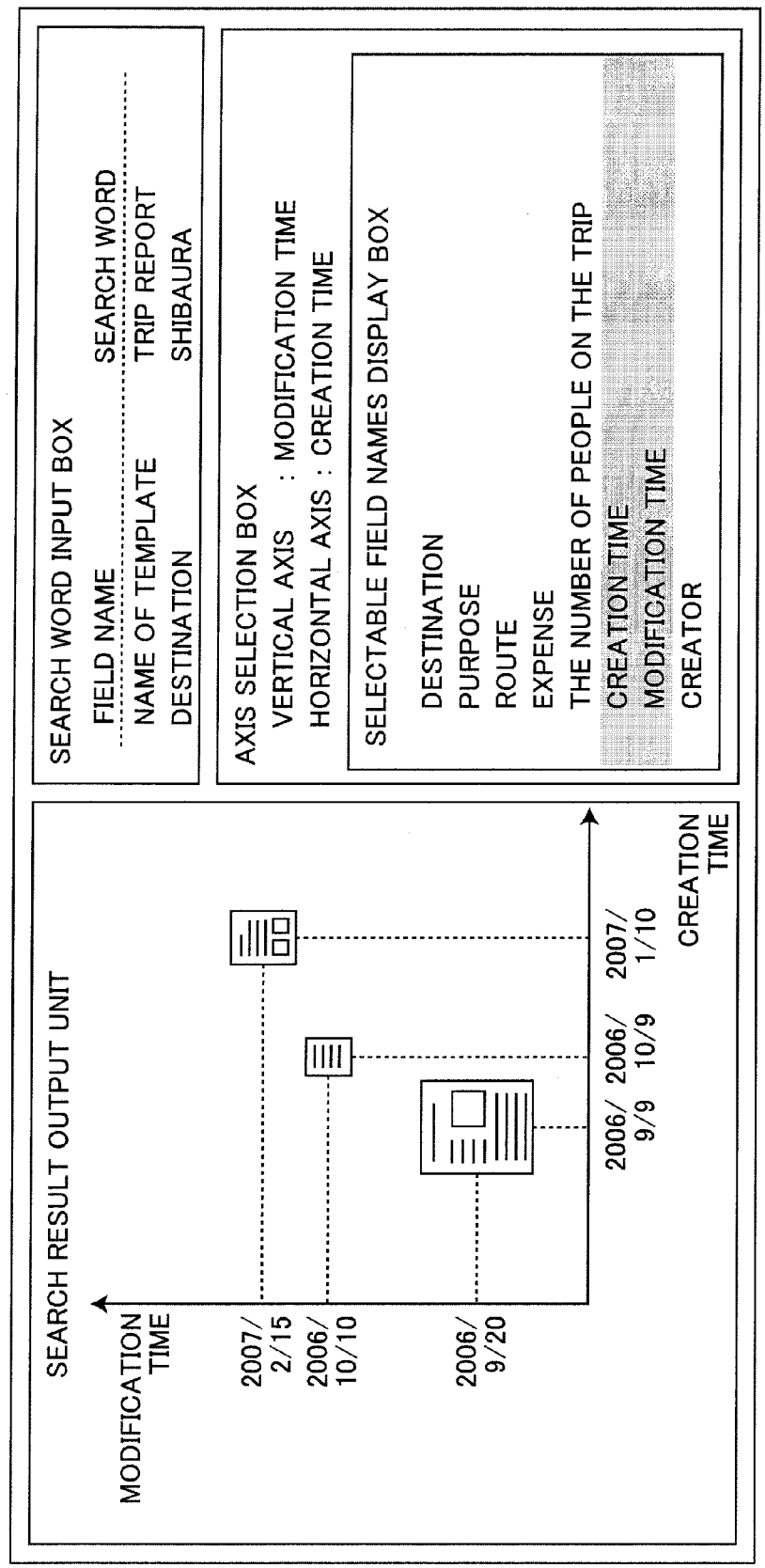
FIG. 8 is a figure describing an example of a search result according to the first embodiment of the present invention.

In a case where the field value corresponding to the search word inputted by the user exists in the field data storage unit 1041 (S402 YES), the search processing unit 110 provides the panel image processing unit 109 with an instruction to display the search result on the touch panel. As shown in FIG. 8, the search result output unit 108 receiving the instruction to display the search result from the panel image processing unit 109 displays a search result screen showing the search result on the touch panel. At this moment, an axis selection box in the search result screen of FIG. 8 displays the selectable field names held in the field data storage unit 1041 (S403). The axis selection box can also display the selected field names. Then, the user selects one of the field names displayed in the axis selection box (S404). The user can simultaneously choose as much as two field names, that is, one field name for a vertical axis, and the other field name for a horizontal axis as shown in FIG. 8. If there still exists the selectable field name and if the number of the selected field names is less than two, the user is prompted to select the field name again (S405 YES).

When the fields are selected for the vertical axis and the horizontal axis, the storage data files are shown represented by icons in a coordinate system composed of the selected vertical axis and the selected horizontal axis as shown in FIG. 8. FIG. 8 shows the search result in a case where the entered search words, namely "trip report" and "Shibaura", are searched in the data storage unit 104. In FIG. 8, "destination", "purpose", "route," expense", "the number of people on the trip", "creation time", "modification time", and "creator" are displayed as the selectable field names for the axes, and the "creation time" and "modification time" are selected for the axes that are used for displaying the search result.

Figure 9:
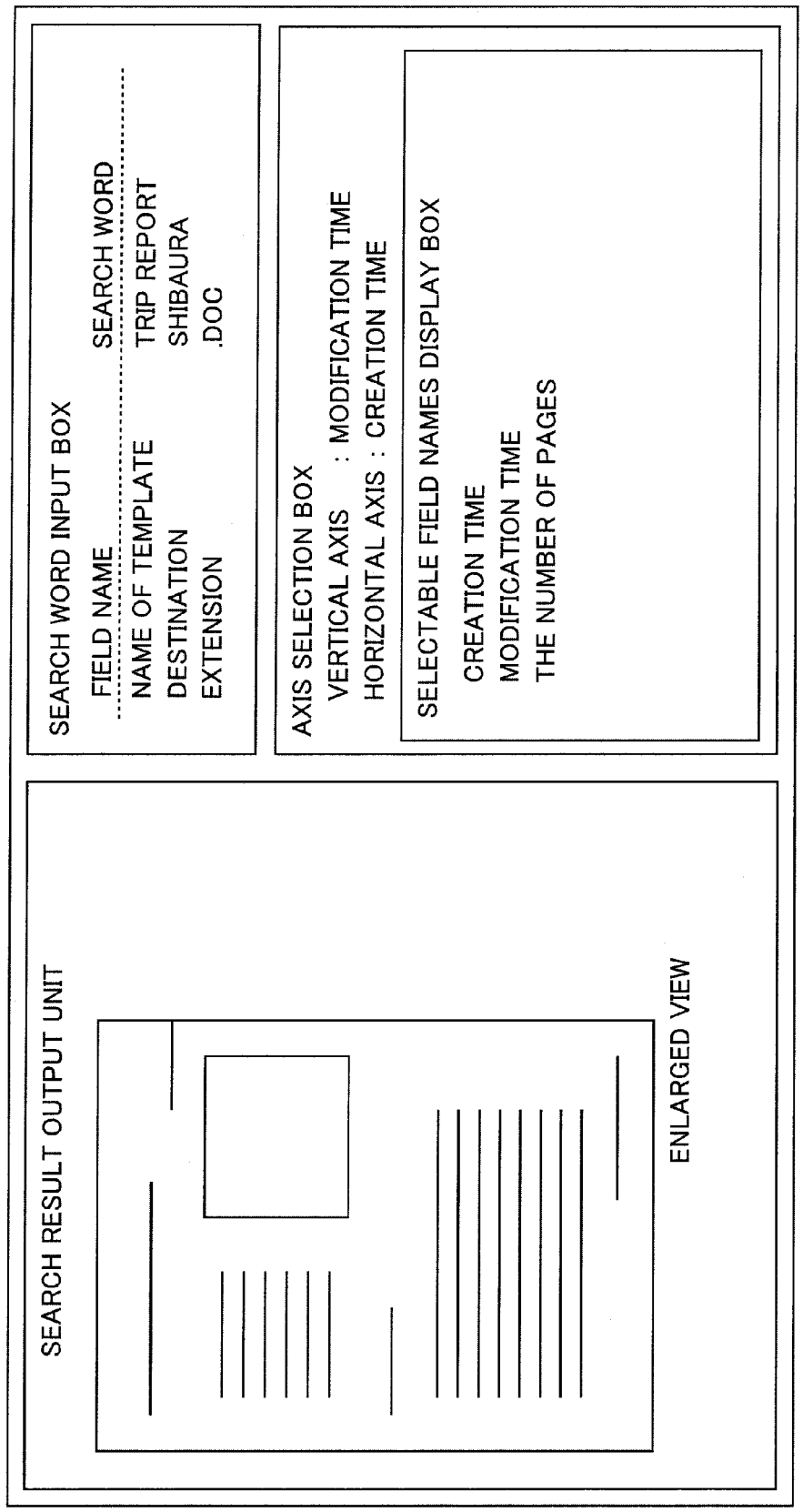
FIG. 9 is a figure describing an example of the search result according to the first embodiment of the present invention.

As shown in FIG. 8, each of the icons representing the document files is displayed in a different size. This is because the sizes of the icons are determined according to the importance rank calculated by the importance evaluation unit 111. The size of the icon of the document file becomes larger, as the importance rank thereof becomes higher. When the evaluation calculation is performed, the time and date of printing, the number of printed copies, and the number of times the document file is selected from the search result are taken into consideration as described above. In addition, the number of times the document file is listed up in the search result and the number of times the document file is selected for enlarged display are also considered. By clicking any one of the icons representing the document files, the document file is enlarged and displayed as shown in FIG. 9.

If there is not the selectable field name anymore or if the number of the selected field data is two, the search result is displayed in the coordinate system composed of the selected axes. Then, the user selects the document file to retrieve or print (S406), so that the selected document is outputted via the data output unit 105 or printed with the printing unit 120, and this series of steps is terminated (S407). Alternatively, in a case where the search word entered by the user at S402 does not exist in the field data in the field data storage unit, this series of steps is terminated without executing the steps S403 to S406 (S402 NO). However, in a case where a termination is not selected at step S407, this series of steps can be started from the step for the input of the search word (S407 NO).

As hereinabove described, the image forming apparatus according to the first embodiment of the present invention enables the user to easily find the document data that the user is looking for because the user can easily find the document data from the search result displayed in an easy-to-see visual layout in the coordinate system composed of the vertical and horizontal axes. Any field can be chosen for the vertical or horizontal axis, and the icons representing the document files in the search result are two-dimensionally sorted based on the fields selected for the axes. In addition, the size of each icon representing the document file is enlarged or reduced according to the previously calculated importance rank. Therefore, the user can instinctively choose the document file that the user is looking for.

For example, when the user is looking for the trip report created in around July and vaguely remembers that the expense is rather expensive but does not remember other precise criteria for the search, the user can choose the field name "creation time" and "expense" as the vertical and horizontal axes in the coordinate system, and the user can enter "July" as the search word, so that the document files created in around July are displayed two-dimensionally sorted according to "creation time" and "expense". The user can compare the files with each other with respect to the creation time and the expense on the same search result screen. Thus, the user can find the document file that the is looking for, even where the user does not remember the exact criteria of the search.

Second Embodiment

Figure 10:
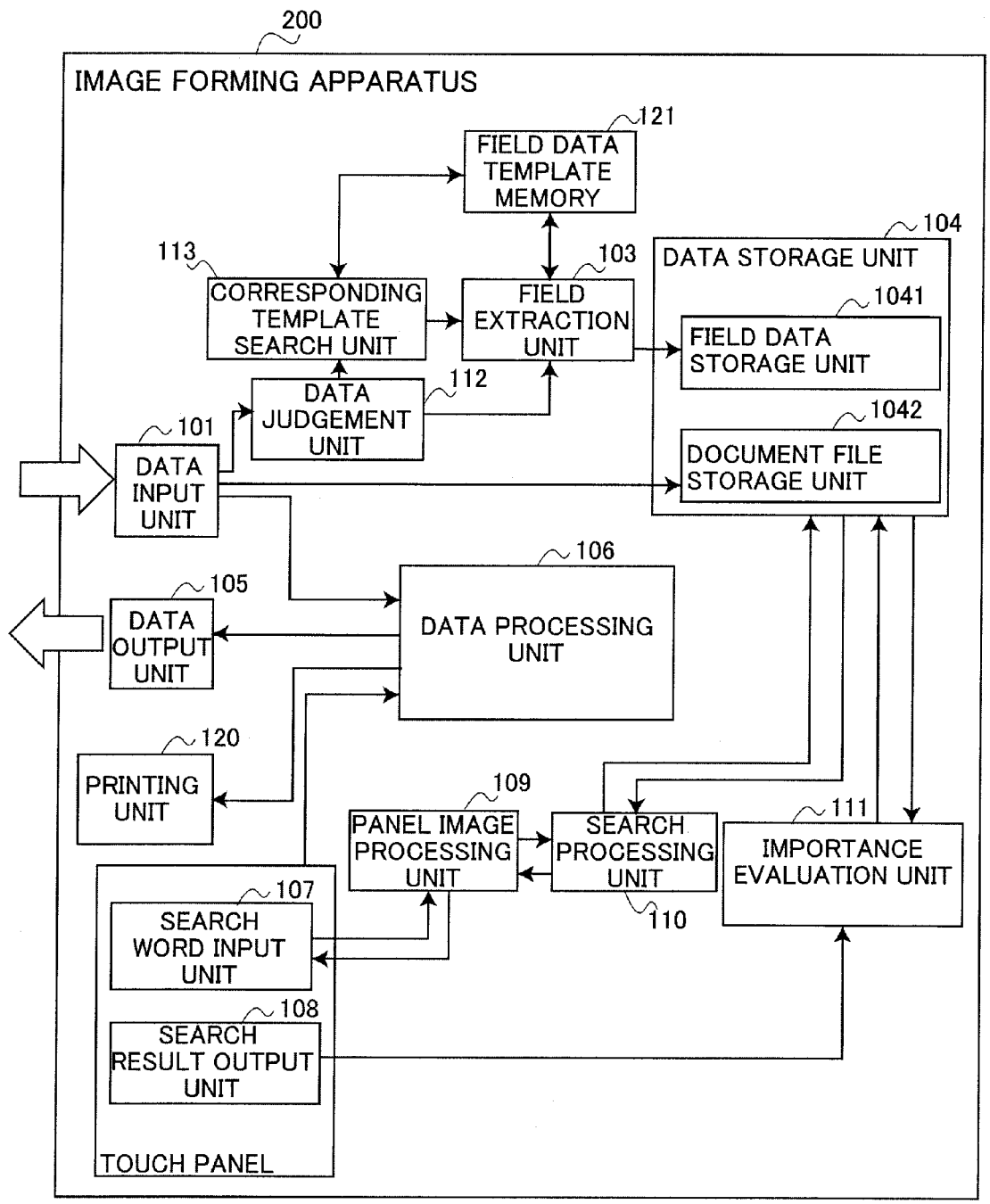
FIG. 10 is a block diagram describing a structure of the image forming apparatus according to the second embodiment.

In the second embodiment, image data such as in a TIFF (Tagged Image File Format) image is stored as non-document data, which the first embodiment does not target for storing. A structure of the image forming apparatus 200 according to the second embodiment is substantially the same as a structure of the image forming apparatus 100 according to the first embodiment. In the below description, units and operation similar to the first embodiment are omitted, and only different units or operation will be described below. FIG. 10 is a block diagram describing the structure of the image forming apparatus 200 having a search device according to the second embodiment. In addition to the image forming apparatus 100 of the first embodiment, the image forming apparatus 200 according to the second embodiment has a data judgment unit 112 and a corresponding template search unit 113.

The data judgment unit 112 makes a judgment as to whether data inputted by the user via the data input unit is the document data or the non-document data.

The corresponding template search unit 113 searches the field data template memory 121 of the image forming apparatus 200 for the field data template corresponding to the inputted non-document data.

Figure 11:
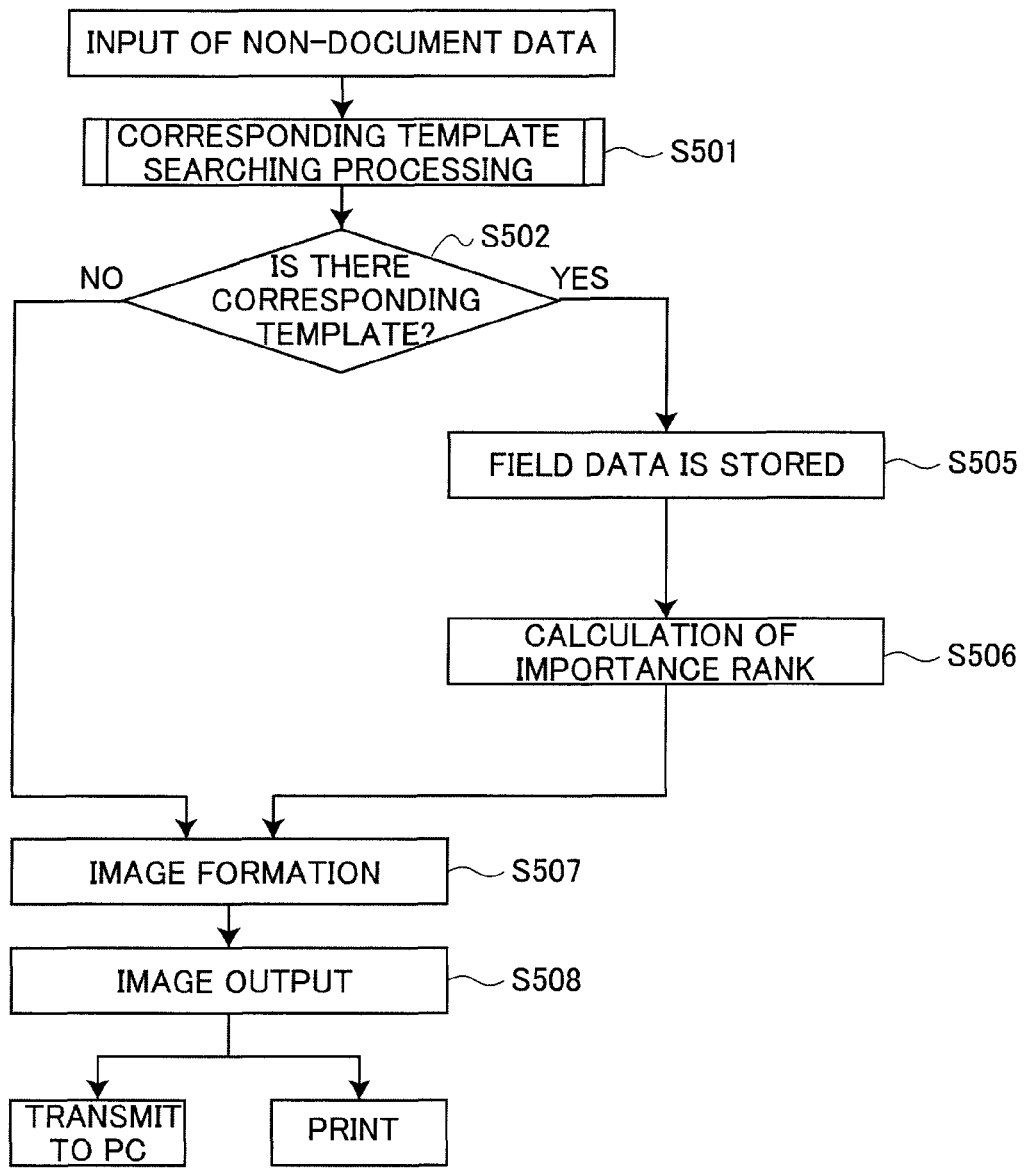
FIG. 11 is a flow chart describing a series of steps from a step for inputting non-document data to the image forming apparatus via the data input unit to a step for outputting via the data output unit.
Figure 12:
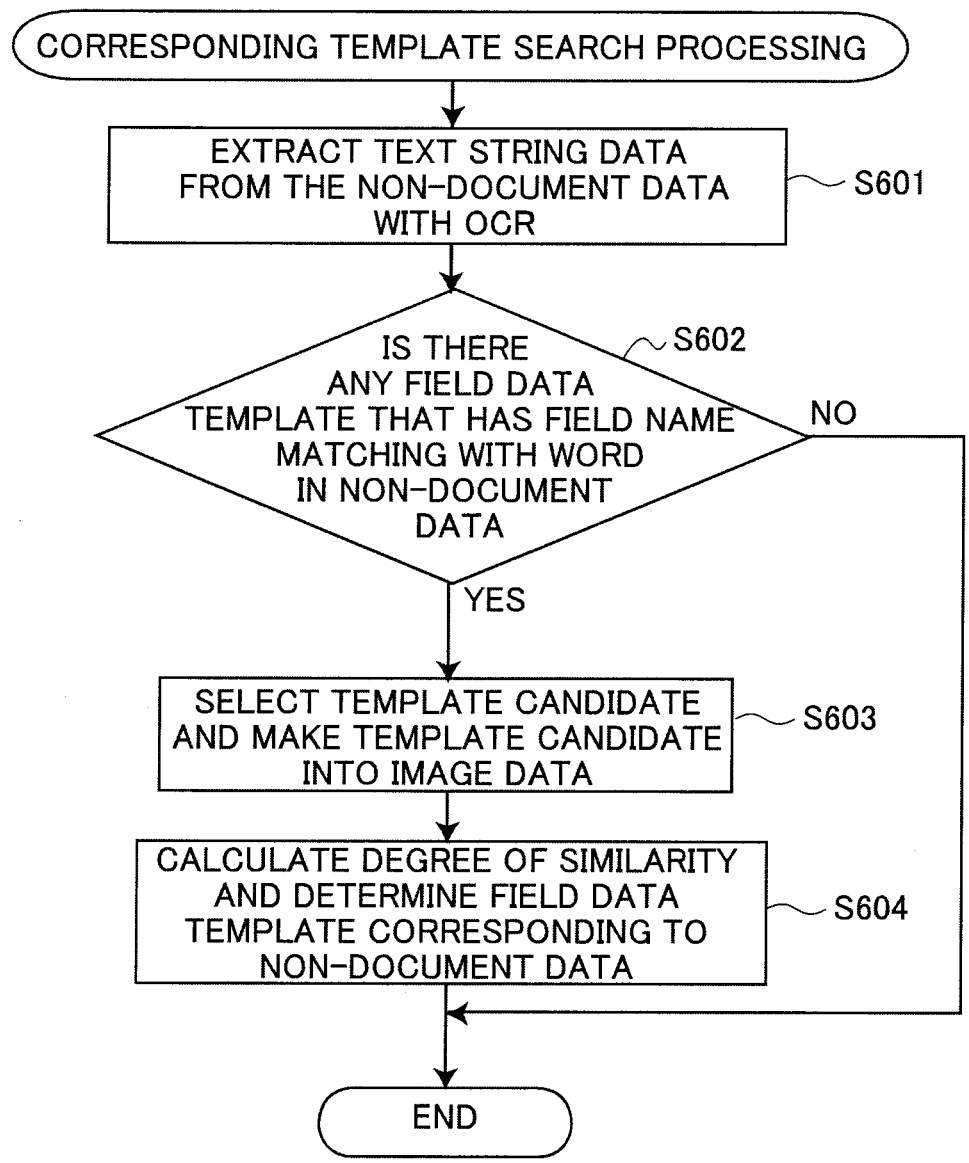
FIG. 12 is a flowchart describing steps executed by a corresponding template search unit according to the second embodiment of the present invention.

FIG. 11 is a flowchart describing a series of steps from the step of the input of the non-document data via the data input unit 101 of the image forming apparatus 100 to the step of the output via the data output unit 105 or printing with the print unit 120. First, when the user inputs the data to the image forming apparatus 200, the data judgment unit 112 judges as to whether the inputted data is the document data or the non-document data. Where the document data is inputted to the image forming apparatus 200, the image forming apparatus 200 operates in the same way as the image forming apparatus 100 of the first embodiment, that is, the image forming apparatus 200 executes the storing of the document data, the searching of the document data, and the displaying of the search result in the same way as the first embodiment.

Where the inputted data is judged to be the non-document data, the corresponding template search unit 113 searches the field data template memory 121 for the corresponding field data template (S501). FIG. 12 is a flowchart describing the steps executed by the corresponding template search unit 113. When the non-document data is inputted, the corresponding template search unit 113 supplies the data to an OCR (Optical Character Reader) to extract character string data from the image data (S601). Subsequently, the corresponding template search unit 113 determines a degree of matching between the extracted character string data and the field data template by searching the extracted character string data for each of the field names in the field data template. The degree of matching is determined for each of the field data templates in the field data template memory 121 (S602). The degree of matching is a value calculated by dividing the number of the matched field names in the field data template by the number of total field names in the field data template. A predetermined number of the field date templates having highest and subsequent degrees of matching are chosen as the template candidates in the order of the degree of matching (S603).

The degree of matching is calculated as described above, and the several template candidates are chosen. However, the template candidate having a high value in the degree of matching may not be necessarily be the field data template matching to the inputted non-document data, because the degree of matching is calculated based on only the number of the matching field names, that is, the degree of matching does not reflect the position where the matching field name appears in the template candidate. Accordingly, the degree of matching may become high in a case where the non-document data having many words that happen to be the same as the field names in the template candidate even though the non-document data has nothing to do with the template candidate. Thus, in addition to the degree of matching, a degree of similarity based on bit map comparison is calculated as described below.

To calculate the degree of similarity based on the bit map comparison, the template candidates are converted into the same image format as the inputted non-document data. The degree of similarity is calculated between the inputted non-document data and each of the template candidates. As a preprocessing prior to a calculation of the degree of similarity, a processing is executed to exclude the field value area from the target of calculation of the degree of similarity as shown in FIG. 13. As shown in FIG. 13, an area for the field values are excluded from the bit map comparison because the field values vary from document to document and this field value area is not needed to be compared for the determination of the corresponding field date template. For example, the degree of similarity is calculated as follows. The corresponding template search unit 113 generates binary bitmap images of the non-document data and the template candidate, and compares each bit therebetween as to whether the bit matches or not. The degree of similarity is calculated by dividing the number of matched bits by the total number of the bits (S604).

A criteria for evaluating an absolute level of similarity is required in the above-described calculation of the degree of similarity, but such absolute criteria is difficult to be determined because the inputted non-document data may be an scanned image having smears and deformed characters thereon or a facsimile-received image. Accordingly, instead of determining an absolute threshold value, a document randomly selected is used for comparison. The degree of similarity is calculated between the randomly selected document and each of the template candidates, and the degree of similarity therebetween having the largest value is determined as a threshold value. The template candidate having the degree of similarity less than the determined threshold value is excluded from the template candidates. In this way, the template candidate having matching words therein but is different in image is excluded from the template candidates.

Then, for each of the template candidates, a total degree is calculated by adding the degree of matching thereof and the degree of similarity thereof. The template candidate having the largest total degree is determined as the field data template corresponding to the non-document data (S502 YES). Then, the field extraction unit 103 extracts the field name-value pairs as text string data from the non-document data upon converting an image of the non-document data at a positions corresponding to positions of the field name-value pairs in the determined field data template. In a case where the text strings do not exist at the position corresponding to the field name-value pairs, a null character is extracted.

The extracted field name-value pairs are stored to the field data storage unit 1041 in the data storage unit 104, and the inputted non-document data is stored in the document data storage unit 1042 in the data storage unit 104 (S505). The field name-value pairs are associated with the corresponding non-document data, from which the field name-value pairs have been extracted. The non-document data is also associated with the corresponding field name-value pairs.

Subsequently, the importance evaluation unit 111 calculates the importance rank of the non-document stored in the data storage unit 104 at step S506. The importance rank is calculated from information such as time and date of printing, the number of printed copies, and the number of times the document file is selected from the search result.

At step S507, the data processing unit 106 performs image formation and the like according to an output format of the inputted non-document data, and outputs the non-document data via the data output unit 105 or print the non-document data with the printing unit 120 (S508). In a case where the corresponding field data template cannot be found (S502 NO), steps S505 to S507 are not executed, and instead, the data processing for direct output is performed.

The search processing and the display processing of the present embodiment are the same as those of the first embodiment, but the search result can be classified into either the document file or the non-document file. When the search results shows both of the document files and the non-document files in a same screen, the size of the icon of each of the non-document files is determined according to the importance rank of the non-document data that is calculated by multiplying the importance rank by the degree of similarity as weighing. The importance rank is calculated as described in the first embodiment. The degree of similarity is described above in the present embodiment.

As described above, the image forming apparatus according to the second embodiment can store the non-document data in addition to the document data. In the present embodiment, the corresponding template search unit 113 can extract the text string data from the non-document data with the OCR, and searches the stored field data templates for the template candidates corresponding to the inputted non-document data based on the field name-value pairs. Furthermore, the corresponding template search unit 113 excludes the template candidates having the degree of similarity less than the threshold value calculated as described above, so as to make sure that the non-document data not corresponding to any of the field data templates is not stored to the file storage unit. Furthermore, in the search result of the image forming apparatus according to the present embodiment, the document data and the non-document data can be displayed on a same screen in a classified manner. Alternatively, only the document data or only the non-document data can be displayed.

Third Embodiment

Figure 14:
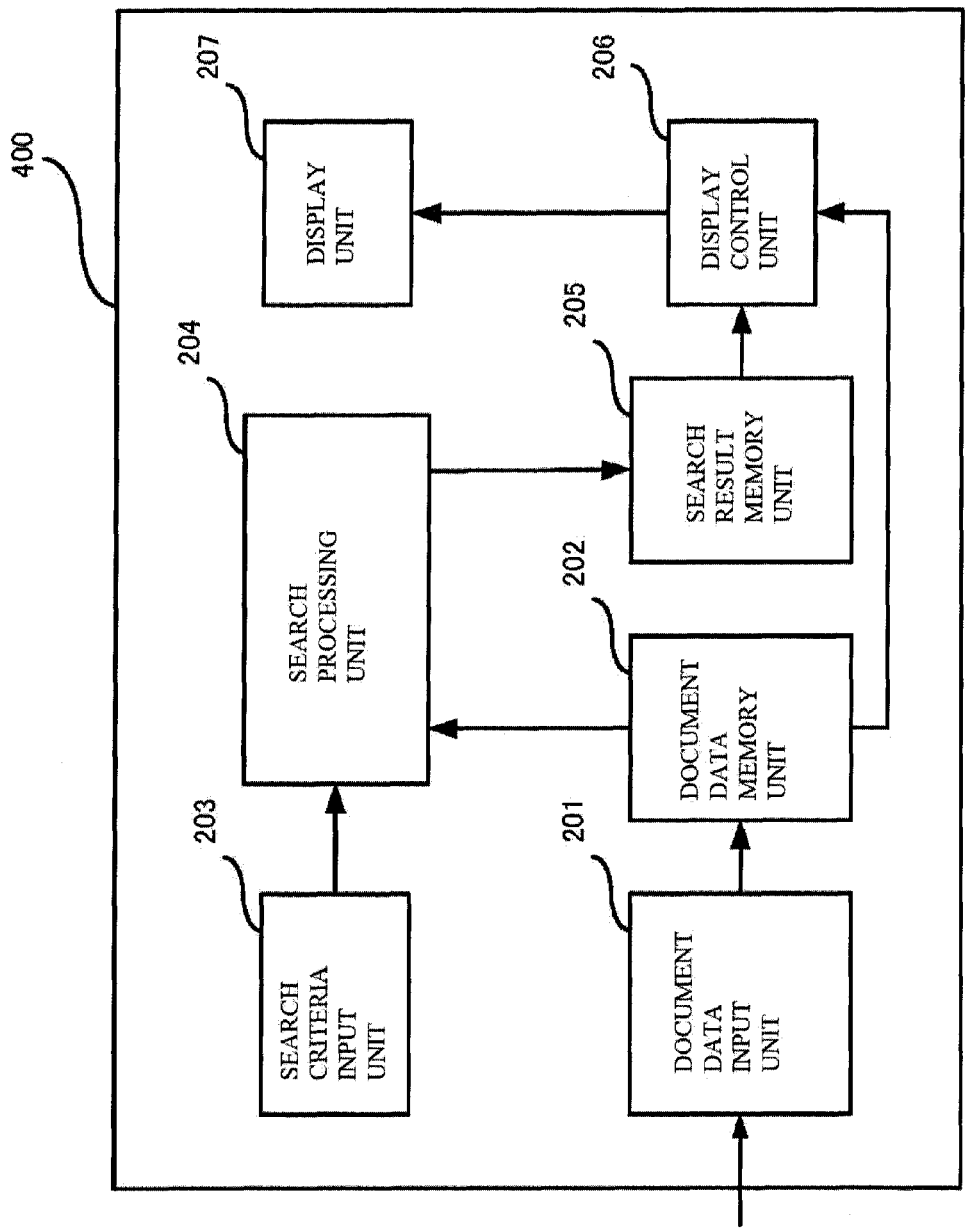
FIG. 14 is a block diagram illustrating functions of a computer serving as a document search apparatus of the third embodiment.

FIG. 14 is a block diagram illustrating functions of a computer 400 serving as a document search apparatus used in the present embodiment.

A document data input unit 201 inputs document data to be searched. Specifically, the document data input unit 201 is an input device such as a keyboard and a mouse or an interface device for inputting the document data as digital data from the outside of the computer 400.

A document data memory unit 202 is a memory unit storing the document data inputted from the document data input unit 201. Specifically, the document data memory unit 202 is a hard disk device and the like. In the present embodiment, the document data is stored therein with a unique filename given to each document data.

A search criteria input unit 203 inputs search criteria such as a search word and a search range for searching. Specifically, the search criteria input unit 203 is a keyboard, a touch panel, and the like.

A search processing unit 204 compares the document data memorized in the document data memory unit 202 with the search word inputted from the search criteria input unit 203 to count the number of the search words included in each of the searched document data. Specifically, the search processing unit 204 is, e.g., a program memorized in a ROM and a CPU executing the program.

A search result memory unit 205 is a memory unit storing a result of a search performed by the search processing unit 204. Specifically, the search result memory unit 205 is a semiconductor memory device such as a hard disk, a RAM, and the like. In the present embodiment, the unique filename of each document file is associated with the number of the search words included in the document file, and the filenames associated therewith and the number of the search words are memorized in the search result memory unit 205.

A display unit 207 is a unit for displaying the search result. For example, a display device such as an LCD, a CRT, and the like can be used as the display unit 207.

A display control unit 206 is a unit that uses the search result memorized in the search result memory unit 205 to process a display format according which the document data memorized in the document data memory unit 202 is displayed on the display unit 207.

Figure 15:
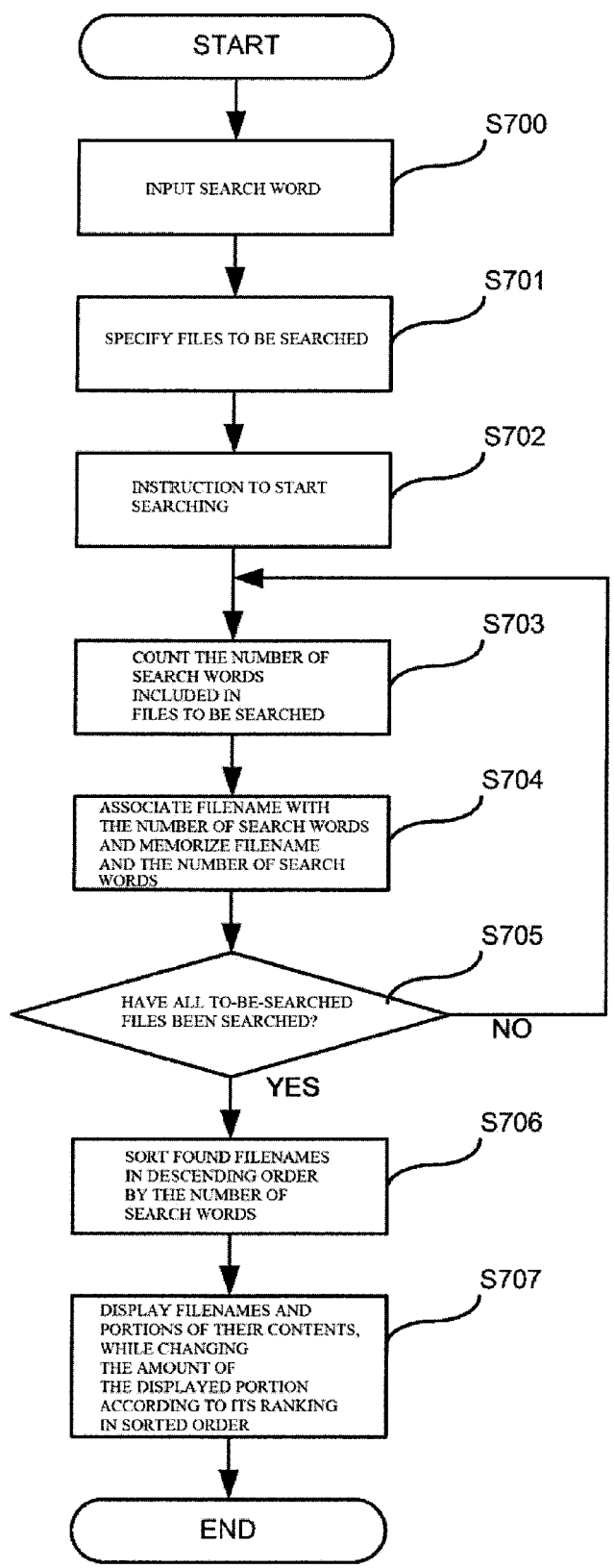
FIG. 15 is a flowchart describing a search processing operation performed by a computer.

FIG. 15 is a flowchart describing a search processing operation performed by the computer 400. It is assumed here that one or multiple document data to be searched is previously memorized in the document data memory unit 202 via the document data input unit 201.

The search processing operation of the computer 400 will be hereinafter described.

(Step S700)

First, a user, who does a search, uses the search criteria input unit 203 to input the search word serving as a key to perform the search.

(Step S701)

Subsequently, with the search criteria input unit 203, the user specifies document data to be searched from among the document data memorized in the document data memory unit 202.

(Step S702)

When a search start instruction is inputted from the search criteria input unit 203, the search processing unit 204 begins the search.

(Step S703)

The search processing unit 204 reads one document data from among the to-be-searched document data memorized in the document data memory unit, and counts the number of the search words included in the document data.

(Step S704)

The search processing unit 204 associates the filename of the document data, in which the search words have been counted, with the number of search words included in the document file, and memorizes the filename associated therewith and the number of search words in the search result memory unit 205.

(Step S705)

The search processing unit 204 makes a determination as to whether all of the to-be-searched document files are finished being searched. In a case where all of them are finished being searched, step S706 is proceeded to. In a case where all of them are not yet finished being searched, step S703 is returned to, and another document file is read.

(Step S706)

The display control unit 206 sorts the filenames memorized in the search result memory unit 205 in descending order by the number of the search words included therein.

(Step S707)

The display control unit 206 reads the document data corresponding to each of the sorted filenames from the document data memory unit 202, and displays portions of the document data together with the filenames on the display unit 207. The amount of the portion of the document data displayed on the display unit 207 is changed and outputted according to the number of the search words included in the document data and the ranking in the sorted order.

Figure 16:
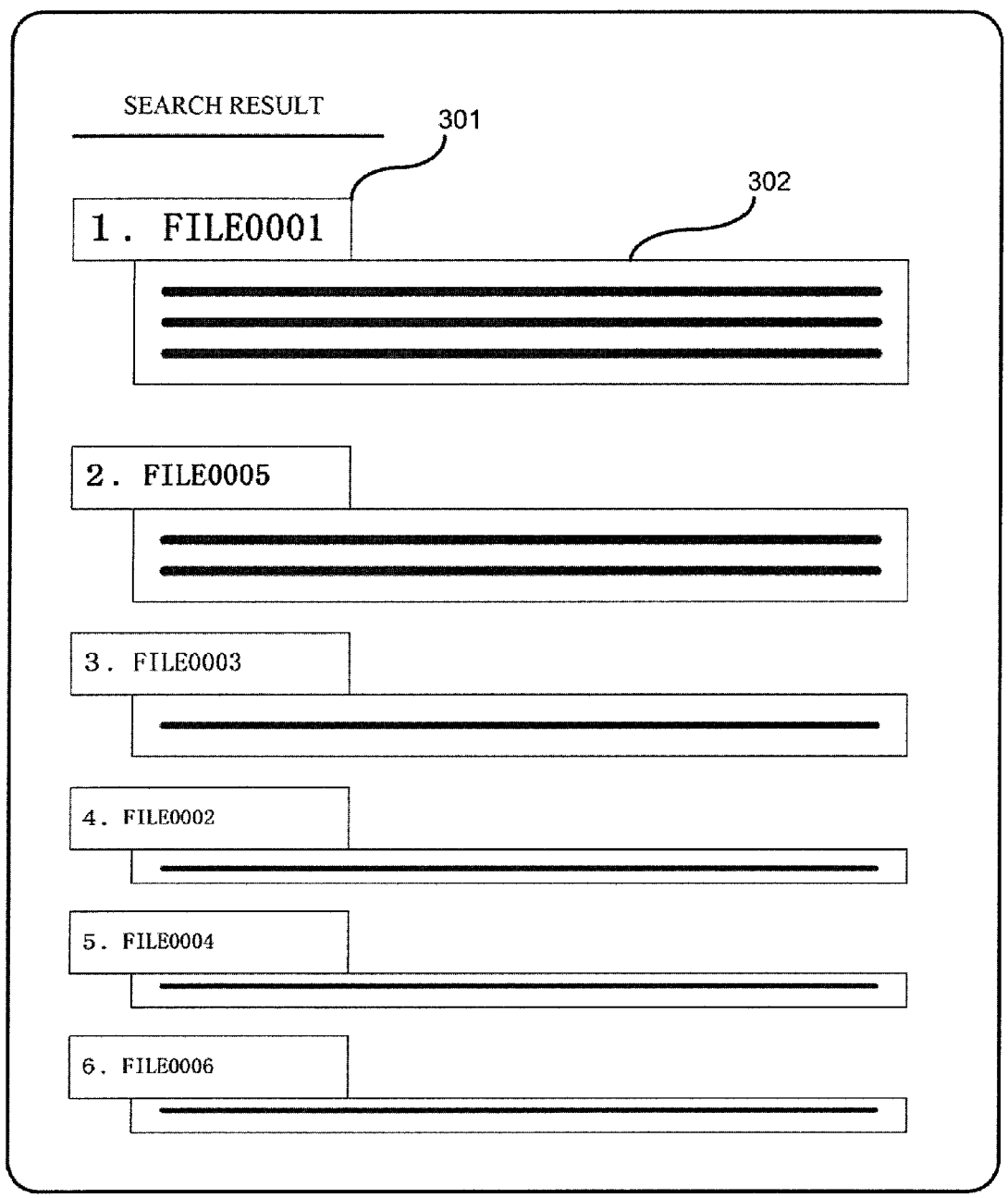
FIG. 16 is a figure describing an example of a screen for showing search results on a display unit.

FIG. 16 is a figure describing an example of a screen for showing the search result on the display unit 220.

A field 301 displays the filename of the found document file and a ranking number in the sorted order.

A field 302 displays a portion of a content of the document data corresponding to the filename displayed in the field 301.

The field 301 and the field 302 are displayed as a pair for each found document file.

In FIG. 16, the document file including the largest number of the search words is "FILE0001". In the field 302 corresponding to "FILE0001", three lines of the document data are displayed.

The document file including the second largest number of the search words is "FILE0005". In the field 302 corresponding to "FILE0005", two lines of the document data are displayed.

In the present embodiment, a font size of the filename displayed in the field 301 serving as a title may be changed according the amount of the document data displayed in the field 302 as shown in FIG. 16.

Although it is assumed in the above description that the document data to be searched is in the document data memory unit 202 in the computer 400, the document data to be searched may be intensively stored in a single file server or distributed and stored in multiple file servers connected with the computer 400 via a network.

As hereinabove described, the amount of the displayed document data can be changed according to the number of the search words included in the found document data, and thus, a user can view the content of the useful document data in detail from among the search result.

The embodiments described above are preferred embodiments of the present invention, but the present invention is not limited thereto, and each structure can be changed as necessary as long as not deviating from the scope of the gist of the present invention.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. A search device comprising:
   a data input unit for inputting document data to the search device;
   a data judgment unit for making a determination whether the document data is image data or non-image data;
   a corresponding template search unit;
   a field data template memory storing a field data template indicating a position of field data within the document data;
   a field extraction unit for extracting the field data from the document data, wherein
   (i) in response to the data judgment unit determining that the document data is image data, the corresponding template search unit searches the field data template corresponding to the document data from the field data template memory, identifies a position of the field data included in the document data according to the found field data template, and thereafter the field extraction unit extracts the field data, and
   (ii) in response to the data judgment unit determining that the document data is non-image data, the field extraction unit extracts the field data from the document data without searching the field data template;
   a data storage unit for storing the field data, the document data, and an importance rank of the document data, the storing associating the document data, the field data and the importance rank, wherein the importance rank is calculated based on document properties independent from an entry of a search word;
   a search word input unit for inputting the search word;
   a search processing unit for searching the field data in the data storage unit based on the inputted search word and for retrieving the document data associated with the found field data; and
   a display unit for displaying an icon representing the document data found by the search processing unit, at a position in a coordinate system, wherein a size of the icon varies according to the importance rank associated with the document data,
wherein the document data is associated with the icon on a one-to-one basis, and
wherein upon clicking the icon, information related to the associated document data becomes viewable.

2. The search device according to claim 1, wherein the field data includes a plurality of field names and a plurality of field values corresponding to the plurality of field names.

3. The search device according to claim 2, wherein the coordinate system has a vertical axis and a horizontal axis, and wherein each of the vertical axis and the horizontal axis has axis labels capable of showing a degree of any one of the plurality of field values.

4. The search device according to claim 3 further comprising, an axis selection unit for selecting one of the plurality of field names for the vertical axis and selecting one of the plurality of field names for the horizontal axis, wherein the axis labels of the vertical axis represent a degree of one of the plurality of field values corresponding to the one of the plurality of field names selected for the vertical axis, and wherein the axis labels of the horizontal axis represent a degree of one of the plurality of field values corresponding to the one of the plurality of field names selected for the horizontal axis.

5. The search device according to claim 1, wherein the non-image data is a computer file generated by word processor software.

6. The search device according to claim 1, wherein the image data is a computer file containing an image.

7. The search device according to claim 1 further comprising:
an importance evaluation unit for calculating the importance rank of the document data based on one or more factors selected from the group consisting of the time and date of printing, the number of printed copies, the number of times a document file associated with the document data is selected from the search result, the number of times the document file is listed in the search result, and the number of times the document file is selected for enlarged display.

8. An image forming apparatus comprising:
a data input unit for inputting document data to the search device;
a data judgment unit for making a determination whether the document data is image data or non-image data;
a corresponding template search unit;
a field data template memory storing a field data template indicating a position of field data within the document data;
a field extraction unit for extracting field data from the document data, wherein
(i) in response to the data judgment unit determining that the document data is image data, the corresponding template search unit searches the field data template corresponding to the document data from the field data template memory, identifies a position of the field data included in the document data according to the found field data template, and thereafter the field extraction unit extracts the field data, and
(ii) in response to the data judgment unit determining that the document data is non-image data, the field extraction unit extracts the field data from the document data without searching the field data template;
a data storage unit for storing the field data, the document data and an importance rank of the document data, the storing associating the document data, the field data and the importance rank, wherein the importance rank is calculated based on document properties independent from an entry of a search word;
a search word input unit for inputting the search word;
a search processing unit for searching the field data in the data storage unit based on the inputted search word and for retrieving the document data associated with the found field data;
a display unit for displaying an icon representing the document data found by the search processing unit, at a position in a coordinate system, wherein a size of the icon varies according to the importance rank associated with the document data,
wherein the document data is associated with the icon on a one-to-one basis,
wherein upon clicking the icon, information related to the associated document data becomes viewable; and
an image forming unit for forming an image according to the document data.

9. A document search system comprising:
an information processing apparatus for generating document data and for inputting the generated document data to the search device;
a data judgment unit for making a determination whether the document data is image data or non-image data;
a corresponding template search unit;
a field data template memory storing a field data template indicating a position of field data within the document data;
a field extraction unit for extracting field data from the document data, wherein
(i) in response to the data judgment unit determining that the document data is image data, the corresponding template search unit searches the field data template corresponding to the document data from the field data template memory, identifies a position of the field data included in the document data according to the found field data template, and thereafter the field extraction unit extracts the field data, and
(ii) in response to the data judgment unit determining that the document data is non-image data, the field extraction unit extracts the field data from the document data without searching the field data template;
a data storage unit for storing the field data, the document data and an importance rank of the document data, wherein the importance rank is calculated based on document properties independent from an entry of a search word;
a search word input unit for inputting a search word;
a search processing unit for searching the field data in the data storage unit based on the inputted search word and for retrieving the document data associated with the found field data; and
a display unit for displaying an icon representing the document data found by the search processing unit, at a position in a coordinate system, wherein a size of the icon varies according to the importance rank associated with the document data,
wherein the document data is associated with the icon on a one-to-one basis, and
wherein upon clicking the icon, information related to the associated document data becomes viewable.

10. The search device according to claim 1, wherein the importance rank is information showing a level of use frequency of the document data stored in the data storage unit.

11. The search device according to claim 1, wherein where the document data is the image data, the template search unit extracts character string data from the document data by using Optical Character Recognition ("OCR"), and thereafter searches the field data template corresponding to the document data from the field data template memory based on the character string data.

12. The search device according to claim 11, wherein where the document data is image data, the template search unit extracts character string data from the document data by using OCR, and thereafter searches a field data template candidate corresponding to the document data from the field data template memory based on the character string data, and wherein the template search unit converts the searched field data template candidate into the same image format as the document data, calculates a degree of matching between the searched field data template candidate and the document data, and thereafter determines the field data template used for extraction of the field data based on the degree of matching.

13. The search device according to claim 12, wherein each bit is compared with respect to the searched field data template candidate and the document data, and determines whether each bit matches or not therebetween, and the degree of matching is calculated by dividing the total number of matched bits by the total number of bits.

14. The search device according to claim 1, wherein the non-image data includes template data, and wherein the field data extraction unit extracts the field data from the non-image data based on the template data.

* * * * *